Oct. 12, 1965 M. ROSENBERG 3,212,071

MAGNETIC MEMORY SYSTEM

Filed June 12, 1961 2 Sheets-Sheet 1

MILTON ROSENBERG
*INVENTOR.*

*BY* Lyon & Lyon

ATTORNEYS

Oct. 12, 1965 M. ROSENBERG 3,212,071

MAGNETIC MEMORY SYSTEM

Filed June 12, 1961 2 Sheets-Sheet 2

MILTON ROSENBERG
*INVENTOR.*

*BY* Lyon & Lyon

ATTORNEYS

United States Patent Office 3,212,071

Patented Oct. 12, 1965

3,212,071

MAGNETIC MEMORY SYSTEM

Milton Rosenberg, Santa Monica, Calif., assignor to Ampex Corporation, Culver City, Calif., a corporation of California Filed June 12, 1961, Ser. No. 116,378

3 Claims. (Cl. 340—174)

This invention relates to magnetic memory systems and, more particularly, to improvements therein.

In an application for a Magnetic Information Storage Device, by Raymond Stuart-Williams, Serial No. 48,885, filed August 11, 1960, now Patent No. 3,162,845, and assigned to this assignee, there is described a memory system comprising a base of magnetic material which has a rectangular grid of grooves on one surface with lands of magnetic material adjacent to the grooves. A separate driving wire placed within each one of the grooves extends along one co-ordinate of said grid, with each wire extending through the entire length of the groove. Means are provided for selectively applying current to one of these driving wires. A plurality of sensing wires are provided. A different one of the sensing wires is placed in a different one of the grooves, which are at right angles to the grooves wherein the driving wires are placed. Each one of the sensing wires is connected to a different amplifier circuit for sensing whether or not a voltage has been induced in the sensing wire in response to the excitation with current of the driving wire. Since the driving and sensing wires are at right angles to one another within open grooves, the current excitation of a driving wire will not induce any voltage in a sensing wire. However, information is stored in the memory in a manner which enables a sensing wire to have a voltage induced therein when a driving wire is excited, by selectively bridging the groove intersections with magnetic material, whereby the magnetic field provided by an excited driving wire at these intersections is distorted. As a result, magnetic flux cuts the sensing wire passing through the groove intersection. Alternatively expressed, a low-reluctance magnetic path is provided at the intersection of two grooves, whereby the flux emitted by an excited drive line follows the low-reluctance path, and thus the sensing wire which is enclosed by said path is cut by magnetic flux and a voltage is induced therein. By bridging across two of the four diagonally opposite lands, a voltage of one polarity is induced in a sensing wire, and, by bridging the remaining two diagonally opposite lands, a voltage of an opposite sense may be induced in the sensing wire.

This type of memory is nondestructive—that is, when information is read out therefrom, it is not removed from the memory. However, the memory requires a mechanical writing technique which, although adequate for many applications, is too slow for many others.

In an application by Milton Rosenberg entitled Magnetic Memory System Serial, No. 116,379, filed June 12, 1961, which is assigned to a common assignee, there is described and claimed a memory which comprises a plate made of magnetic material having two states of stable magnetic remanence. The magnetic memory elements on this plate are provided by each of the regions which exist within separate groups of four holes. A plurality of these groups of holes are disposed about the magnetic plate. Drive lines are provided which enable the selective drive of the data-storage regions to one or the other of the two states of remanence, whereby data may be stored, and digit-sense windings are provided, which are effectively coupled to the data-storage regions and wherein voltages may be induced by driving the data-storage regions to a predetermined one of their two states of magnetic remanence, whereby data sensing is effectuated.

This memory system, which can be called an aperture-plate memory system, is a fast, destructive, read-type of memory. It has utility in those applications where sub-microsecond operation is necessary, where the cycle time for read and write is short, and where there is a good probability that the data in the memory will be changed.

An object of the present invention is the provision of a novel memory system in which the data stored therein is not destroyed; even though it is read out of the memory.

Another object of the present invention is the provision of a unique memory system which has an extremely fast readout time and which is nondestructive.

Another object of the present invention is the provision of a memory system which is nondestructive during readout and which has a fast writing time.

Yet another object of the present invention is the provision of a memory system which combines all the best features of the previously described memory systems.

These and other objects of the invention may be achieved in an arrangement wherein the aperture-plate magnetic memory and the rectangular-grid magnetic memory are positioned adjacent one another in a manner so that the data stored in the aperture-plate memory may be read out by the rectangular-grid memory without destroying said data. This accordingly provides a memory system with high-speed write-in and readout of data in which, although the readout of data does not destroy the data, the data can be altered at high speed.

The novel features that are considered characteristic of this invention are set forth with particularity in the appended claims. The invention itself, both as to its organization and method of operation, as well as additional objects and advantages thereof, will best be understood from the following description when read in connection wtih the accompanying drawings, in which:

Figure 1:
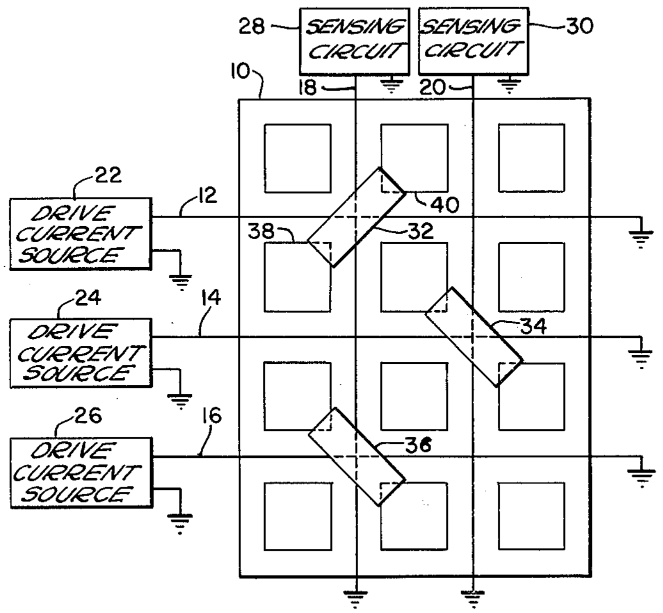
FIGURE 1 is a drawing of a grooved-plate, nondestructive type of readout memory.

Referring now to FIGURE 1, there is shown a drawing of a grooved-plate type of memory similar to that which is described and claimed in the previously indicated application by Raymond Stuart-Williams. An understanding of this arrangement is necessary in order to understand the operation of the embodiment of the invention. This memory comprises a plate made of magnetic material 10, which is milled or otherwise formed to have a rectangular grid of grooves which space a plurality of lands. By a land is meant a portion of the plate in which there is no groove. A different drive wire 12, 14, 16 is placed in each one of the parallel grooves extending in one direction and a different sense wire 18, 20 is placed in a different one of the parallel grooves extending at right angles to the grooves in which the drive wires are placed. A separate drive current source, respectively 22, 24, 26, is provided to drive or apply a pulse of current to each of the drive windings 12, 14, 16. These drive current sources may be selectively energized. The fact that the sense windings 18, 20 are at right angles to the drive lines 12, 14, 16, or drive windings, insures that none of the lines of flux produced as a result of the drive currents cut the sense windings 18, 20, and, therefore, no signals are induced in the sensing circuits 28, 30, respectively associated with the drive lines 18, 20.

By placing a bridging member, such as 32, 34, 36, which is made of magnetic material, across an intersection of a drive line and a sense line, a low reluctance path is produced for the flux which results when current flows through one of the drive lines which passes through the bridged intersection, which serves to distort that flux in a manner so that the sense windings 18, 20, are cut and a signal is induced therein. The bridging member 32 rests upon opposite lands 38, 40 and bridges the intersection therebetween. Thus, when drive-current source 22 applies a current pulse to the drive line 12, a voltage is induced in the line 18 and detected by the sensing circuit 28. No voltage is induced in the line 20, since there is no bridging circuit at the intersection of this line with the drive line 12.

Upon the application of a drive current from the source 24 to the line 14, no voltage is induced in the winding 18, but, because of the presence of the bridging member 34, the magnetic flux established by the current in the line 14 is distorted, and there is a voltage induced in the line 20 which is detected by the sensing circuit 30. The magnetic member 36 is positioned in reverse to the magnetic member 32. This causes a voltage to be induced in the sensing line 18 when the drive current source 26 applies a current to the line 16, which voltage has a polarity opposite to that which is induced in the sensing line 18 when a drive current is applied to the line 12. Thus, the memory provides three types of readout signals, if desired—a positive signal, a negative signal, or the absence of a signal.

Figure 2:
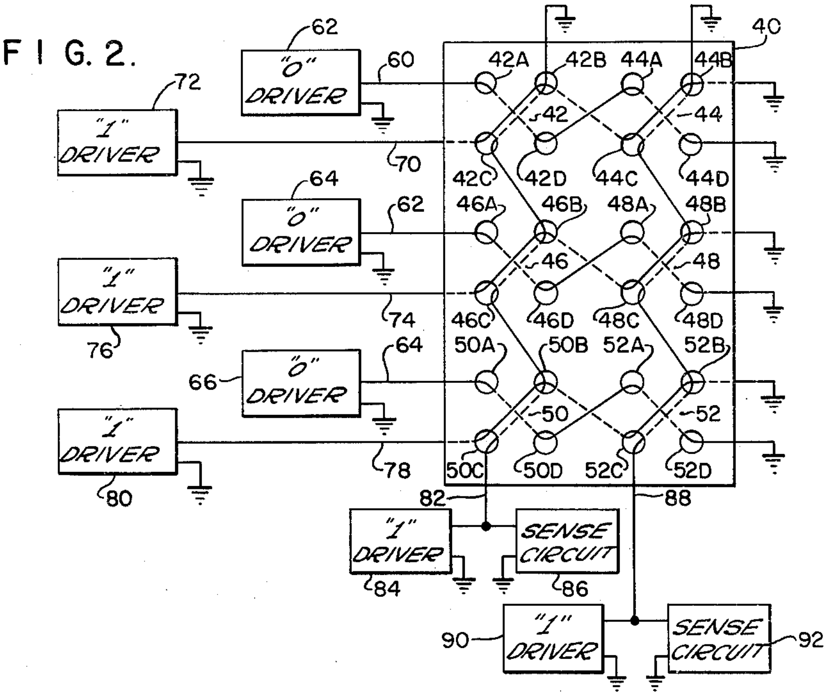
FIGURE 2 is a drawing of an aperture-plate type of magnetic memory.

FIGURE 2 is a drawing of an aperture-plate-type of memory which is described and claimed in the previously mentioned application by Milton Rosenberg. The aperture plate 40 is of magnetic material having two states of magnetic remanence. The plurality of storage elements 42, 44, 46, 48, 50, 52 may be defined as the regions on the plate 40 which lie in the area within four associated apertures. Thus, the data-storage region 42 lies within the area contained between the spaced apertures 42A, 42B, 42C, and 42D.

Windings are provided for driving the data-storage regions from one to the other of two states of magnetic remanence representative of the binary bits of data stored. To accomplish these functions, a zero-drive winding 60, which receives a current pulse from a zero-drive pulse source 62 is inductively coupled to the elements 42 and 44 by respectively passing down through the aperture 42A, up through the aperture 42D, then down through the aperture 44A, and up through the aperture 44D. A current pulse may be applied to the winding 60, which has sufficient amplitude to drive both the data-storage element 42 and the data-storage region 44 to their zero states of magnetic remanence.

There is provided for the elements 46 and 48 a zero-drive winding 62, which receives current pulses from the zero-drive source 64. The winding 62 is coupled to the associated A and C apertures of the elements 46 and 48 in the same manner as was described for the winding 60. Another drive winding 64 is driven from the zero-drive source 66. It is coupled to the elements 50 and 52 by passing through the associated A and C apertures in similar fashion as was described for the winding 60 for the elements 42, 44.

A "one" driver winding 70 is coupled to the data-storage regions 42, 44 by passing through the aperture 42C, then through aperture 42B, and thereafter through aperture 44C, and then through aperture 44B. The winding 70 is driven by a one-driver current-pulse source 72. This one-driver current-pulse source applies sufficient current to the winding 70 to provide half the required drive to the data elements 42, 44 for driving them to the state of magnetic remanence opposite to the one to which they are driven by the zero-driver current pulse.

A second one-driver 76 applies a current pulse to the one-driver winding 74. This one-driver winding is coupled to the data-storage regions 46, 48 by passing through their associated C and B apertures in the same manner as has been described for the one-driver winding 70. Another one-driver winding 78 receives current pulses from the one-driver current pulse source 80. The one-driver winding 78 is inductively coupled to the data-storage regions 50, 52 by being coupled to their C and B apertures in the same fashion as has been described for the one-driver winding 70.

A digit-drive winding 82 is inductively coupled to all the elements 42, 46, 50 by passing through their associated B and C apertures. The digit-drive winding 82, when used for write-in, receives a drive current from a one-driver current-pulse source 84. The current applied to the winding 82 is half that required for driving the magnetic element from one to the other state of magnetic remanence. Thus, in order to drive the element 42 to its one state of magnetic remanence, it is necessary to excite the winding 82 and the winding 70. A sense circuit 86 is connected to the winding 82, since this winding may also be used to sense the contents of a data-storage region. For effectuating readout, a zero-driver current-pulse source, for example, the zero-driver current-pulse source 62, is excited. This applies the current pulse to the winding 60. If the data-storage region 42 is in the state of magnetic remanence to which it is being driven by the excited drive winding, no voltage is induced in the sense winding 82. If, however, the data-storage region is in its one state of magnetic remanence, then a voltage is induced in the sense winding, since the drive current applied to the winding 60 drives the data-storage region 42 toward the zero-representative state of magnetic remanence.

A second digit plane or sense winding 88 is provided which is coupled inductively to the elements 44, 48, 52 by passing through the same apertures, B to C, as the respective one-driver windings 70, 74, and 78. The winding 88 receives a one-drive from the one-driver source 90. A sense circuit 92 is also connected to the winding 88 for co-operating therewith when it is used as a sense winding.

Figure 3:
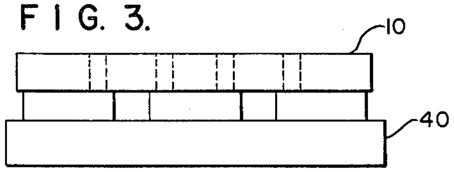
FIGURE 3 is a side view of an embodiment of this invention.

It will be appreciated that the memory system shown in FIGURE 1 does not lose its information when readout is attempted therefrom. However, the insertion of data in the memory is a fairly slow process. The memory shown in FIGURE 2 has a destructive readout operation. However, the write-in of information therein is extremely rapid. In accordance with this invention, as shown in FIGURE 3, it is proposed to superimpose the memory of FIGURE 2 upon the memory of FIGURE 1. Such superimposition of the magnetic-plate memory 10 on the magnetic plate 40 occurs in a manner so that the data-storage regions of the magnetic plate 40 are superimposed over the intersections of the drive lines and the sense lines. Of course, the magnetic bridging elements 32, 34, and 36 are omitted in this case.

Figure 4:
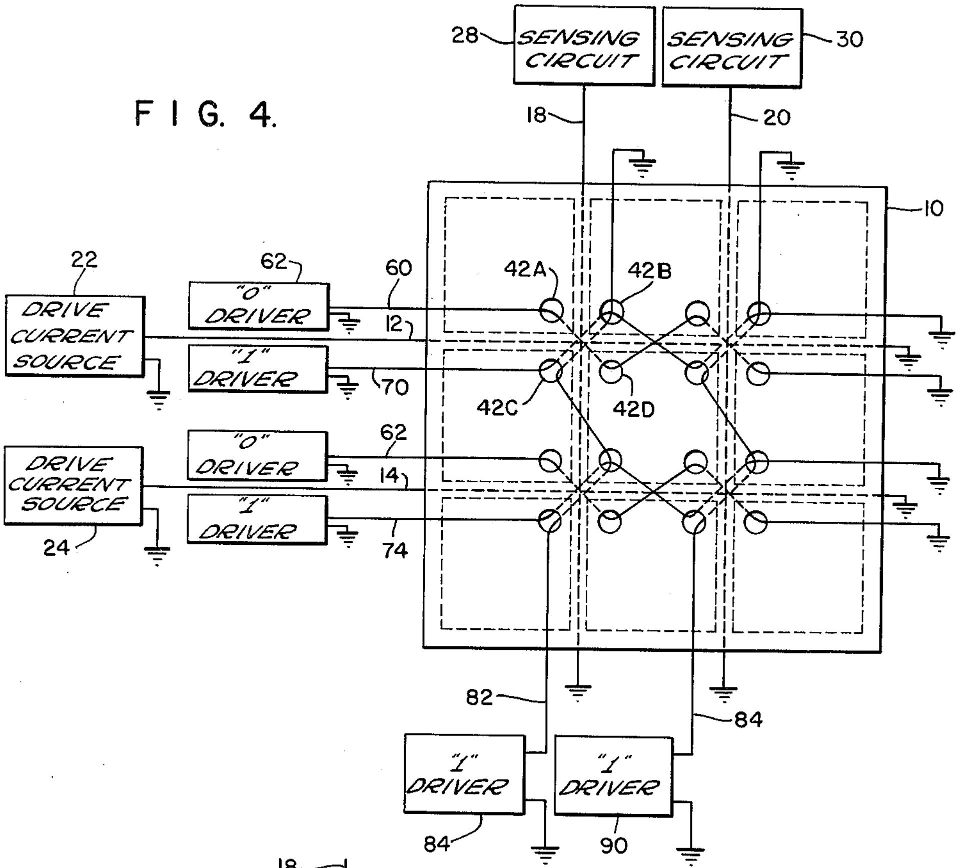
FIGURE 4 is a view in elevation of an embodiment of this invention.

FIGURE 4 shows a view of the embodiment of the invention in elevation. Structures in FIGURE 4, which function similar to the structures shown and described in FIGURES 1 and 2, will be given the same reference numerals. It will be seen that all of these structures are the same; thus, no new reference numerals are added. However, the two memories co-operate in a manner to provide a much-better-functioning memory which has both the features of nondestructive readout as well as high-speed write-in, when desired. This is accomplished by the flux distortion, which is introduced at the intersection of the drive and sense lines of the grooved-plate memory by the state of remanent magnetization of the data-storage regions on the aperture-plate memory.

Figure 5:
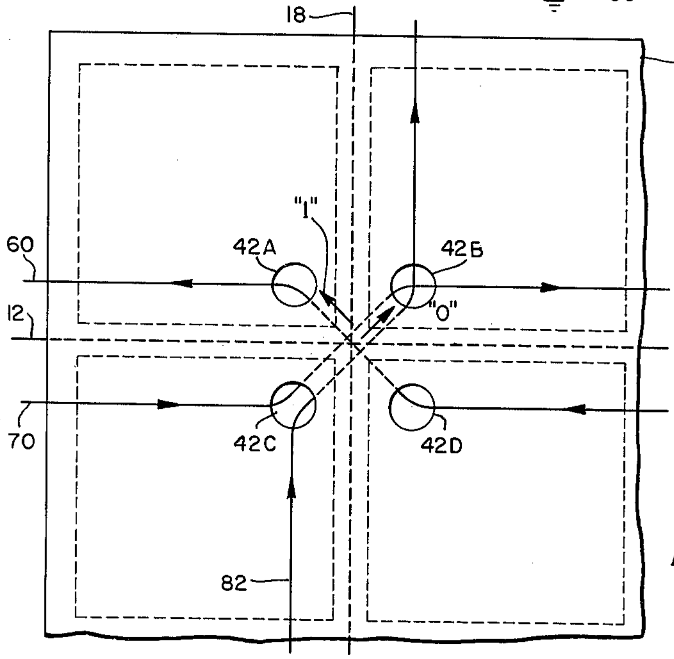
FIGURE 5 is an enlarged view of a portion of FIGURE 4, which is shown to assist in explaining the theory of the operation of the invention.

This will be better understood by referring to FIGURE 5, which is an enlarged section of FIGURE 4.

By applying a current pulse to the line 60, which has the direction indicated by the arrowheads on the line, the magnetization vector of the data-storage region is aligned in the direction indicated by the arrow. This is the zero state. The vector of the state of remanent magnitization, is at right angles to the direction of the winding which is excited. The easy direction or lower-reluctance direction at the intersection of the windings on the grooved plate is the one which is represented by the arrow, designated by the reference numeral 1. This is at right angles to the zero-representative arrow. The ferrite material of the plate which bridges the lands of the grooved plate and which is in the easy or lower reluctance direction operates in the same manner as one of the bridging members 32, 34, or 36. This will introduce a flux distortion at the intersection of the drive and sense lines which can cause a voltage having a predetermined polarity to be induced in the sense line 18. Should the windings 70 and 82 be excited with current, then the data-storage region is driven to its opposite state of magnetic remance, which is orthogonal to the zero state of magnetic remanence. In this event, the easy-reluctance direction is in the direction of the arrow labeled with the zero. As a result, when the drive winding 12 is excited with current, a voltage having a polarity of the opposite sense is induced in the sense winding 18.

Referring again to FIGURE 4, from what has just been described, it should be apparent that the memory is a word-organized type of memory—that is, a word of data at a time is sensed upon excitation of any one of the drive-current source 22 or 24. Data is entered into the memory by first exciting the zero-drive current source associated with the row of data-storage elements in which storage is desired. Thereafter, the one driver is energized to apply current to a one-driver winding associated with the predetermined row and a digit winding, which is coupled to the data-storage element in the predetermined row in which it is desired to store a "one." For readout, an excitation of either the drive-current source 22 or the drive-current source 24 is effectuated. The sensing windings 18 and 20, as a result, have induced in them a voltage of one or the other polarity, representative of the data which has been stored. The excitation of the drive windings 12, 14 does not erase or alter the state of magnetic remanence in the aperture-plate memory. Accordingly, the data may be read out of the memory as often as desired without destroying it.

The windings employed with the apertured plate should preferably be printed-circuit wiring, to enable the two plates to be brought close to one another. The size of the memory which is shown in the drawings is exemplary and should not be construed as a limitation upon the invention.

There has accordingly been described hereinabove a novel and useful magnetic-memory system which affords both nondestructive readout and high-speed write-in.

I claim:

1. A memory system comprising a plurality of first wires, a plurality of second wires each of which crosses said plurality of first wires and is orientated with respect to each of said plurality of first wires in a manner not to be magnetically coupled thereto, and means for magnetically coupling said first and second wires including a first plate of magnetic material having two stable states of magnetic remanence, said first plate having a plurality of data-storing regions a different one of which is positioned adjacent a different one of the crossings of a first and second wire, and a second plate of magnetic material having grooves in the surface thereof within which each of said plurality of first wires and each of said plurality of second wires can fit, said grooves being separated from each other by lands of material, said plate of magnetic material having a plurality of data storage regions being positioned in contact with said lands of said second plate of magnetic material, a group of apertures for each of said data-storing regions spaced around each data-storage region, drive-winding means coupled to each different one of said data-storing regions by passing through the aperture group associated therewith for driving it to one or the other of its states of magnetic remanence in accordance with the data desired to be stored, and means for selectively applying current to one of said first wires for including voltages in each of said second wires representative of the data stored in the data-storing regions at the crossings of said excited first wire with each of said second wires.

2. A memory system comprising a first plate of magnetic material having at least one groove extending transversely thereacross and a plurality of grooves crossing said one groove at right angles thereto, a first drive wire positioned in said one groove, a plurality of sense wires a different one of which is positioned in a different one of said plurality of grooves, a second plate of magnetic material made of magnetic material having at least two states of magnetic remanence, said second plate having a plurality of data-storing regions, said second plate being positioned in contact with said first plate with its data-storing regions bridging the intersections of said first drive wire with said plurality of second wires, a separate group of apertures for each data-storing region, first drive-winding means inductively coupled to all said data-storing regions by passing through predetermined apertures of said groups of apertures for driving said data-storing regions to one of said two states of remanence, second drive-winding means inductively coupled to all of said data-storing apertures by passing through apertures of said groups of apertures other than said predetermined apertures, a separate third drive-winding means for each of said data-storing regions inductively coupled thereto by passing through the same apertures as said second drive-winding means, means for applying excitation to said second drive-winding means and selectively to said third drive-winding means for driving predetermined ones of said data-storing regions to the other of said two states of magnetic remanence, and means for applying current to said first wire for inducing voltages in each of said second wires representative of the state of remanence of the data-storing region at the intersection of said second wire with said first wire.

3. A magnetic-memory system comprising a first and second plate of magnetic material, said first plate having a rectangular grid of grooves on one surface thereof, a separate drive wire in each one of the parallel grooves extending in one direction of said grid, a separate sensing wire in each one of the grooves extending along the other direction of said grid, said second plate being placed in juxtaposition with said first plate, said second plate having a data-storage region positioned over each intersection of said drive and sense wires, the data-storage regions being aligned in columns and rows, a group of apertures associated with each of said data-storage regions, each of said apertures being spaced about the periphery of its associated data-storage region, first drive-winding means inductively coupled to each one of the data-storage regions in a row by passing through apertures in the group associated with each one of the data-storage regions in said row, means for applying current to first drive-winding means for driving each of the data-storage regions associated therewith to one state of magnetic remanence, second drive-winding means inductively coupled to each one of the data-storage regions in said row by passing through apertures in said groups associated with each of said data-storage regions, means for applying a current pulse to said second drive-winding means for driving said data storage toward the opposite state of magnetic remanence, a separate third drive-winding means coupled to each one of the data-storage regions in a separate column, each said separate drive-winding means being inductively coupled to said data-storage regions in a column by passing through the apertures in the groups associated with each one of said data-storage regions, and means for selectively applying current to said third drive-winding means for assisting said second drive-winding means in driving predetermined ones of said data-storage regions to their opposite state of magnetic remanence whereby upon excitation of a drive wire there is induced in each of said sense wire a voltage whose polarity is determined by the state of magnetic remanence of the data-storage region at the intersection of a sense winding with said excited drive winding.

References Cited by the Examiner

UNITED STATES PATENTS

| | | | |
|---|---|---|---|
| 2,825,891 | 3/58 | Duinker | 340—174 |
| 2,942,240 | 6/60 | Rajchman | 340—174 |
| 3,134,964 | 5/64 | Wanlass | 340—174 |

IRVING L. SRAGOW, *Primary Examiner.*